(12) United States Patent
Kaltenbach et al.

(10) Patent No.: US 11,890,815 B2
(45) Date of Patent: *Feb. 6, 2024

(54) INTERNET-ENABLED APPARATUS, SYSTEM AND METHODS FOR PHYSICALLY AND VIRTUALLY RENDERING THREE-DIMENSIONAL OBJECTS

(71) Applicant: TRIPETALS, LLC, Albuquerque, NM (US)

(72) Inventors: Christopher Kaltenbach, Sharjah (AE); Luke Nihlen, Albuquerque, NM (US); Luis M. Ortiz, Albuquerque, NM (US)

(73) Assignee: Tripetals, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,752

(22) Filed: Jan. 24, 2022

(65) Prior Publication Data

US 2022/0143919 A1 May 12, 2022

Related U.S. Application Data

(60) Continuation of application No. 16/693,292, filed on Nov. 23, 2019, now Pat. No. 11,235,530, which is a
(Continued)

(51) Int. Cl.
*B29C 64/386* (2017.01)
*B29C 64/357* (2017.01)
(Continued)

(52) U.S. Cl.
CPC ............ *B29C 64/386* (2017.08); *B29C 64/00* (2017.08); *B29C 64/357* (2017.08); *B33Y 50/02* (2014.12)

(58) Field of Classification Search
None
See application file for complete search history.

(56) References Cited

U.S. PATENT DOCUMENTS 6,004,124 A 12/1999 Swanson et al.
9,902,109 B2 2/2018 Kaltenbach et al.
(Continued)

FOREIGN PATENT DOCUMENTS

EP 1 168 266 A2 1/2002
EP 168 266 A3 1/2002
(Continued)

OTHER PUBLICATIONS

U.S. Appl. No. 15/862,861; Information Disclosure Statement, Jan. 1, 2018.
(Continued)

*Primary Examiner* — Sean Shechtman
(74) *Attorney, Agent, or Firm* — Ortiz & Lopez, PLLC; Luis M. Ortiz; Kermit D. Lopez

(57) ABSTRACT

Three-dimensional object bridge between virtual and physical worlds. A method, system, apparatus and/or computer-usable medium includes steps of selecting a three-dimensional item in a first state for subsequent rendering into a second state and rendering the three-dimensional item in the second state via the three-dimensional rendering apparatus. An additional step of locating a three-dimensional rendering apparatus for rendering the three-dimensional item in a second state can be included. The three-dimensional rendering apparatus can be configured as a kiosk (manned or unmanned), Internet-enabled vending machine, and the like. The first state can comprise a virtual state and the second state can comprise a physical state. Likewise, the first state can comprise a physical state and the second state can comprise a virtual state. Additionally, the three-dimensional
(Continued)

item/object can be mapped in the first state for rendering in the second state.

13 Claims, 7 Drawing Sheets

Related U.S. Application Data continuation of application No. 15/862,861, filed on Jan. 5, 2018, now Pat. No. 10,486,365, which is a continuation of application No. 13/961,195, filed on Aug. 7, 2013, now Pat. No. 9,902,109, which is a division of application No. 12/246,952, filed on Oct. 7, 2008, now abandoned.

(51) Int. Cl.
*B29C 64/00* (2017.01)
*B33Y 50/02* (2015.01)

(56) References Cited

U.S. PATENT DOCUMENTS

| | | | |
|---|---|---|---|
| 10,486,365 B2 | 11/2019 | Kaltenbach et al. | |
| 2005/0236253 A1 | 10/2005 | Shur | |
| 2006/0188145 A1* | 8/2006 | Song | B33Y 50/00 382/141 |
| 2008/0296374 A1* | 12/2008 | Gonen | B65F 1/1484 705/14.54 |
| 2010/0088650 A1 | 4/2010 | Kaltenbach et al. | |
| 2016/0354975 A9 | 12/2016 | Kaltenbach et al. | |
| 2018/0194067 A1 | 7/2018 | Kaltenbach et al. | |
| 2020/0164583 A1 | 5/2020 | Kaltenbach et al. | |

FOREIGN PATENT DOCUMENTS

| | | |
|---|---|---|
| GB | 2462319 A | 10/2010 |
| JP | 2006-035562 A | 2/2006 |
| WO | 2008032200 A2 | 3/2008 |
| WO | 2008032200 A3 | 3/2008 |
| WO | 2008048311 A3 | 4/2008 |
| WO | 2008076764 A1 | 6/2008 |
| WO | 2008106196 A1 | 9/2008 |

OTHER PUBLICATIONS

U.S. Appl. No. 15/862,861; Notice of References Cited, Mar. 21, 2019.
U.S. Appl. No. 15/862,861; Information Disclosure Statement, Jul. 23, 2019.
U.S. Appl. No. 15/862,861; Information Disclosure Statement, Mar. 21, 2019.
U.S. Appl. No. 13/961,195; Information Disclosure Statement, Aug. 7, 2013.
U.S. Appl. No. 13/961,195; Notice of References Cited, Dec. 22, 2017.
U.S. Appl. No. 13/961,195; Notice of References Cited, Nov. 25, 2016.
U.S. Appl. No. 13/961,195; Notice of References Cited, May 2, 2016.
U.S. Appl. No. 13/961,195; Notice of References Cited, Feb. 11, 2016.
U.S. Appl. No. 12/246,952; Information Disclosure Statement, Oct. 7, 2009.
U.S. Appl. No. 12/246,952; Notice of References Cited, Jun. 20, 2012.
U.S. Appl. No. 12/246,952; Notice of References Cited, May 12, 2011.
U.S. Appl. No. 12/246,952; Notice of References Cited, Mar. 19, 2013.
Dec. 12, 2007, "How 3-D Printing Figures to Turn Web Worlds Real—WSJ.com".
T. Fukada; "Anything, anytime, anywhere"; Sep. 23, 2008, The Japan Times.
Jul. 31, 2008, "Technology Review: 3-D Printing for the Masses".
Saul Hansell, "Beam it Down From the Web Scotty", New York Times.
P. Wayner, "Beaming Up 3-D Objects on a Budget", New York Times, Apr. 5, 2007.
Handyscan 3D Sneak Preview: Creaform Shifts to 4D and Pre-Releases the VIUscanTM 3D Color Scanner, Aug. 12, 2008; www.creaform3d.com.
Vending Machine; Wikipedia; http://en.wikipedia.org/wiki/Vending_machine.

* cited by examiner

INTERNET-ENABLED APPARATUS, SYSTEM AND METHODS FOR PHYSICALLY AND VIRTUALLY RENDERING THREE-DIMENSIONAL OBJECTS

CROSS-REFERENCE TO PATENT APPLICATION

This patent application is a continuation of U.S. patent application Ser. No. 16/693,292, entitled "Internet-Enabled Apparatus, System and Methods for Physically and Virtually Rendering Three-Dimensional Objects," which was filed on Nov. 23, 2019 and issued as U.S. Pat. No. 11,235,530 on Feb. 1, 2022. U.S. patent application Ser. No. 16/693,292 is incorporated herein by reference in its entirety.

U.S. patent application Ser. No. 16/693,292 is a continuation of U.S. patent application Ser. No. 15/862,861 entitled "Internet-Enabled Apparatus, System and Methods for Physically and Virtually Rendering Three-Dimensional Objects," which was filed on Jan. 5, 2018 and is incorporated herein by reference in its entirety, and which issued as U.S. Pat. No. 10,486,365 on Nov. 26, 2019.

U.S. patent application Ser. No. 15/862,861 is a continuation of U.S. patent application Ser. No. 13/961,195 entitled "Internet-Enabled Apparatus, System and Methods for Physically and Virtually Rendering Three-Dimensional Objects," which was filed on Aug. 7, 2013 and is also incorporated herein by reference in its entirety, and which issued as U.S. Pat. No. 9,902,109 on Feb. 27, 2018.

U.S. patent application Ser. No. 13/961,195 in turn is a divisional of U.S. patent application Ser. No. 12/246,952 entitled "Internet-Enabled Apparatus, System and Methods for Physically and Virtually Rendering Three-Dimensional Objects," which was filed on Oct. 7, 2008 and is incorporated herein by reference in its entirety. This application therefore traces and claims priority to the Oct. 7, 2008 filing date of U.S. patent application Ser. No. 12/246,952.

TECHNICAL FIELD

Embodiments are generally related to electronic kiosks, vending machines and rapid-prototyping methods and systems. Embodiments are also related to mobile communications devices and web-based virtual environments.

BACKGROUND

Automatic vending machines and kiosks are utilized in a variety of commercial and non-commercial settings. A typical vending machine or kiosk is a device that provides various snacks, beverages and other products to consumers. The concept is based on the sale of products without a cashier. Items sold via vending machines vary by country and region. In many countries, vending machines generally serve the purpose of selling snacks and beverages, but are also common in busy locations to sell a variety of items, from newspapers to portable consumer electronics.

In Japan, for example, vending machines or kiosks are utilized quite extensively. Due to population density, limited space, a preference for shopping on foot or by bicycle, low rates of vandalism and petty crime, and a small and decreasing number of working-age people, there seems to be no limit to what is sold by such vending machines. While the majority of machines in Japan are stocked with drinks, snacks, and cigarettes, one occasionally finds vending machines selling items such as bottles of liquor, cans of beer, fried food, underwear, MP3 players (i.e., Apple iPods™), magazines and so forth. Japan has the highest number of vending machines per capita, with about one machine for every 23 people.

One of the problems with modern vending machines/kiosks is the inability of such devices to provide customer-specified products on-demand. A vending machine user is limited to a selection of items available in the vending machine itself. For example, if a user desires to purchase a particular type of item, the user must search a vending machine that provides that particular item. If there are no vending machines available to provide that particular item, the user is then forced to find an alternative source, such as visiting a store for that item. The modern vending machine is thus a passive device that is limited to only those items stocked within the vending machine/kiosk.

Based on the foregoing it is believed that a need exists for an improved apparatus, method, and/or system that overcomes the problems inherent with such vending machines/kiosks. There is also a need for a three-dimensional product bridge between the physical and virtual worlds. Such an approach is disclosed in greater detail herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide methods, systems, and a computer-usable medium for rendering a three-dimensional object from a first state to a second state.

It is a further aspect of the present invention to provide for a three-dimensional rendering apparatus for rendering a three-dimensional object from a first state to a second state.

It is another aspect of the present invention to provide for an Internet-enabled manufacturing three-dimensional rendering apparatus, system, method and/or computer-usable medium.

It is yet another aspect of the present invention to provide for a vending machine/unmanned kiosk/terminal for manufacturing and dispensing an item.

It is still a further aspect of the present invention to provide for a vending machine/unmanned kiosk/terminal that is capable of recycling an item manufactured and dispensed by the vending machine/unmanned kiosk/terminal.

The aforementioned aspects and other objectives and advantages can now be achieved as described herein.

A method, system, apparatus and/or computer-usable medium are disclosed, which involves selecting a three-dimensional item in a first state for subsequent rendering into a second state; locating a three-dimensional rendering apparatus for rendering the three-dimensional item in a second state; and rendering the three-dimensional item in the second state via the three-dimensional rendering apparatus. In response to a particular user input, the three-dimensional item can be rendered in the second state via the three-dimensional rendering apparatus. The three-dimensional rendering apparatus can be configured as a kiosk (manned or unmanned), Internet-enabled vending machine, and the like. The first state can comprise a virtual state and the second state can comprise a physical state. Likewise, the first state can comprise a physical state and the second state can comprise a virtual state. Additionally, the three-dimensional item/object can be mapped in the first state for rendering in the second state.

Thus, a device/system and methodology are disclosed that allows a consumer to easily purchase affordable three-dimensional items remotely (e.g., via a wireless device) or directly and collect such items from a three-dimensional rendering apparatus such as, for example, a vending machine, unmanned kiosk, terminal, etc., where the item is produced upon demand. Such an approach minimizes the cost of warehousing product inventory and can be placed in a variety of locations, and additionally, can dispense in any direction (e.g., state-to-state) while also capable of integrating with any existing system. The disclosed embodiments are modular in nature and capable of operating within the context of a quick-service environment.

The product/item can be returned to the three-dimensional rendering apparatus, where the product (i.e., product's material) is melted and then recycled for future use. Alternatively, an object of a particular size may be scanned three-dimensionally at any location, sent via the internet remotely/wirelessly, fabricated via the three-dimensional rendering apparatus (i.e., vending machine/unmanned kiosk/terminal) and collected at that particular three-dimensional rendering apparatus.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Disclosed herein is a device/system and methodology that allows a consumer to easily purchase affordable three-dimensional items remotely (e.g., via a wireless device) or directly and collect such items from a three-dimensional rendering apparatus such as, for example, a vending machine, unmanned kiosk, terminal, etc., where the item is produced upon demand. Such an approach minimizes the cost of warehousing product inventory and can be placed in a variety of locations, and additionally, can dispense in any direction while also capable of integrating with any existing system. The disclosed embodiments are modular in nature and capable of operating within the context of a quick-service environment.

The product/item can be returned to the three-dimensional rendering apparatus, where the product (e.g., product's material) is melted and then recycled for future use. Alternatively, an object of a particular size may be scanned three-dimensionally at any location, sent via the internet remotely/wirelessly to a particular three-dimensional rendering apparatus, fabricated via the three-dimensional rendering apparatus (e.g. vending machine/unmanned kiosk/terminal) and collected at that particular three-dimensional rendering apparatus.

Figure 1:
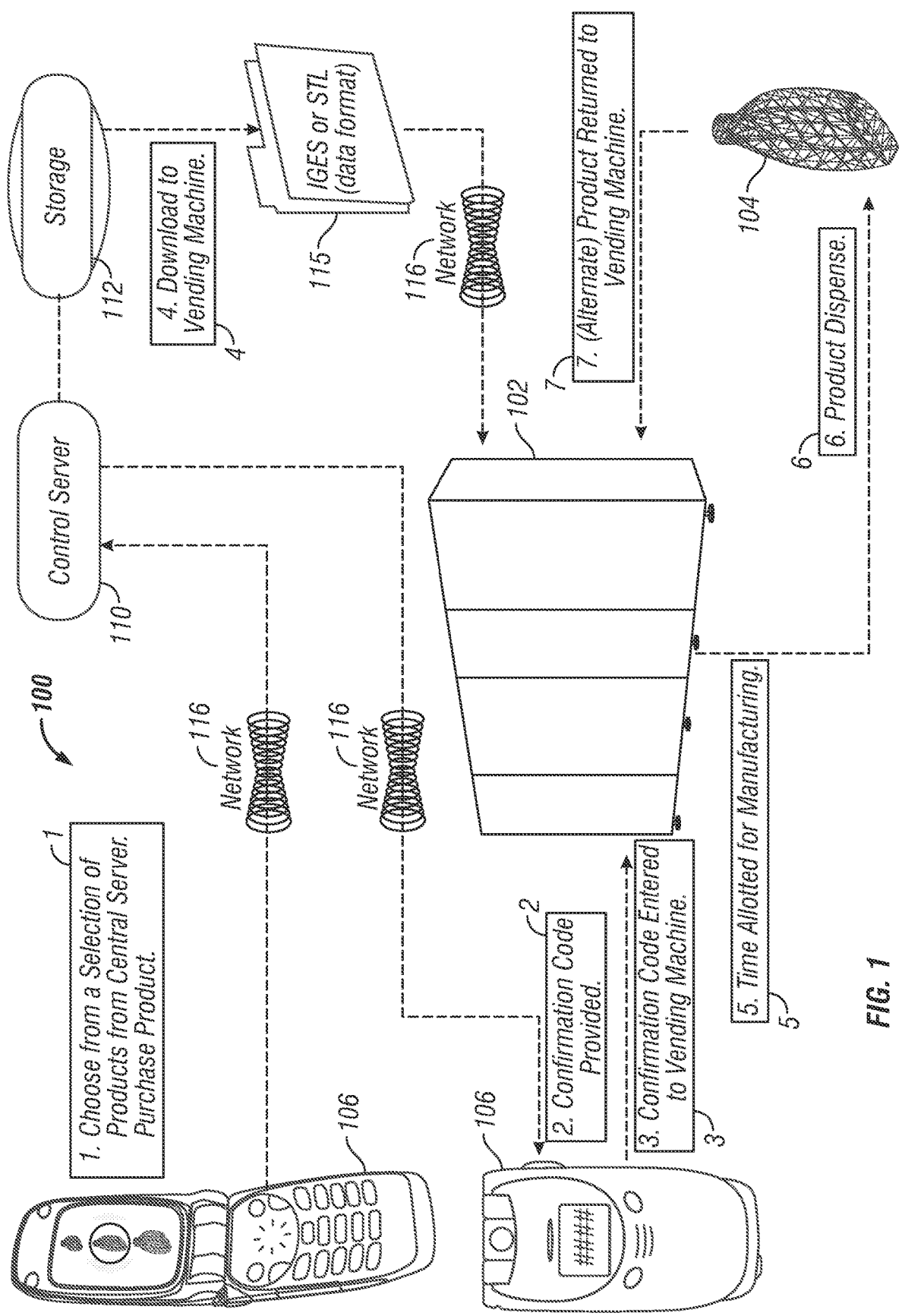
FIG. 1 illustrates a block diagram of a system for rendering a three-dimensional item via a three-dimensional rendering apparatus in accordance with a preferred embodiment.

FIG. 1 illustrates a block diagram of a system 100 for rendering a three-dimensional item via a three-dimensional rendering apparatus 102 in accordance with a preferred embodiment. System 100 can be configured to include a control server 110 that communicates with a storage unit 112 (e.g., memory, database, etc.). System 100 can include the use of one or more wireless hand held devices, such as hand held device 106, which may communicate with control server 110 through a network 116 (e.g., the Internet, cellular network, GSM, CDMA, HSPDA, WiFi, WiMAX, LAN, 3G, 4G, Bluetooth, etc.) to locate and use a three-dimensional rendering apparatus.

System 100 provides the ability to make a remote purchase transaction of an object via the purchasing of a product data model file 115 of an object from a mobile entity such as, for example, a wireless handheld device 106. Note that the computer-aided design file is capable of being exported into a file 115 (see FIG. 4), such as an Initial Graphic Exchange Specification (IGES), Standard for the Exchange of Product Model Data (STEP) file, or other equivalent product data model file. The wireless handheld device 106 may be, for example, a cellular telephone or other mobile communication device, such as a laptop computer, a PDA, Smartphone, Blackberry device, iPhone™, etc. It should also be understood that although a handheld device is specified in this part of the description, some applications can include the use of a desktop computer to carry out features of the invention. The cost of the on-the-spot manufacturing, materials, automatic identification method, A.I.M./Reconfigurable chip (i.e. RFID tag) may be added to the cost of the dispensed three-dimensional product 104. A consumer can, for example, make one payment for both the dispensed product 104, uploaded product data model file 115 and the item 104 manufactured by the three-dimensional rendering apparatus 102.

The 3D specification drawings can be produced utilizing any number of three-dimensional modeling and rendering applications. For example, U.S. Pat. No. 7,300,619, which issued to Napadensky, et al. on Nov. 27, 2007, relates to compositions and methods for use in three-dimensional model printing. U.S. Pat. No. 7,300,619 is herein incorporated by reference in its entirety. Another three-dimensional application that can be utilized in the modeling and rendering of product data model file(s) 115 is disclosed in U.S. Pat. No. 7,300,613, which issued to Sano, et al. on Nov. 27, 2007, which describes a process for producing a three-dimensional model in a short period of time and at low cost, the three-dimensional model having excellent coloration and strength, high surface gloss and transparency, and a colored appearance, and also to provide production equipment used for this process. U.S. Pat. No. 7,300,613 is herein incorporated by reference in its entirety.

Another approach that can be utilized to create the product data model file 115 is disclosed in U.S. Pat. No. 7,369,915, which issued to Kritchman, et al. on May 6, 2008 and relates to a device, system and method for accurate printing of three-dimensional objects. U.S. Pat. No. 7,369,915, which is incorporated by reference in its entirety, relates to the field of rapid prototyping (RP), and more particularly to methods of achieving high accuracy of dimensions and high quality in three-dimensional (3D) printing. Another technique which can be utilized to produce the product data model file 115 in association with the three-dimensional rendering apparatus 102 is disclosed in U.S. Pat. No. 7,332,537, which issued to Bredt, et al. on Feb. 19, 2008, and relates to a three dimensional printing material system and method.

Customer data associated with a user of system 100 can be held securely in a database, such as storage unit 112. Such database can be associated with the payment gateway and is not transmitted over the Internet/network 116 or held in the mobile terminal 106. A micropayment account opened at a bank can be synchronized continuously with the payment gateway. To provide payment of fees for content, a reservation of a certain amount is made in the payment account via the payment gateway and is authorized by the user to the provider allowing the provider to debit amounts against the reservation. Actual charges can be transmitted from the provider to the payment gateway and allocated against the reservation debiting the amounts from the micropayment account, crediting the provider and canceling the reserved amount.

System 100 thus provides a user with the ability to choose from a wide selection of products from a mobile entity such as, for example, the wireless handheld device 106. In situations where mobility is not required, a user may make such a selection using a device such as a desktop computer (e.g., see computer 714 in FIG. 7). Note that a control server 110 can transmit identifying information (e.g., code/special identification tag) to a customer (e.g., after product reservation/purchasing). The identifying information is then fed to the vending machine/unmanned kiosk/terminal 102 manually or from a mobile entity such as wireless hand held device 106 (e.g., accessing a proximity service, comprising: a client device forming a direct point-to-point communication link with a service device) (e.g., vending machine/unmanned kiosk/terminal 102). Note that the vending machine/unmanned kiosk/terminal 102 can download (e.g., information retrieval) from a server (e.g., control server 110), an Initial Graphic Exchange Specification (IGES)/Standard for the Exchange of Product Model Data (STEP) file or equivalent product data model file 115 via an internet connection and/or network 116.

Figure 4:
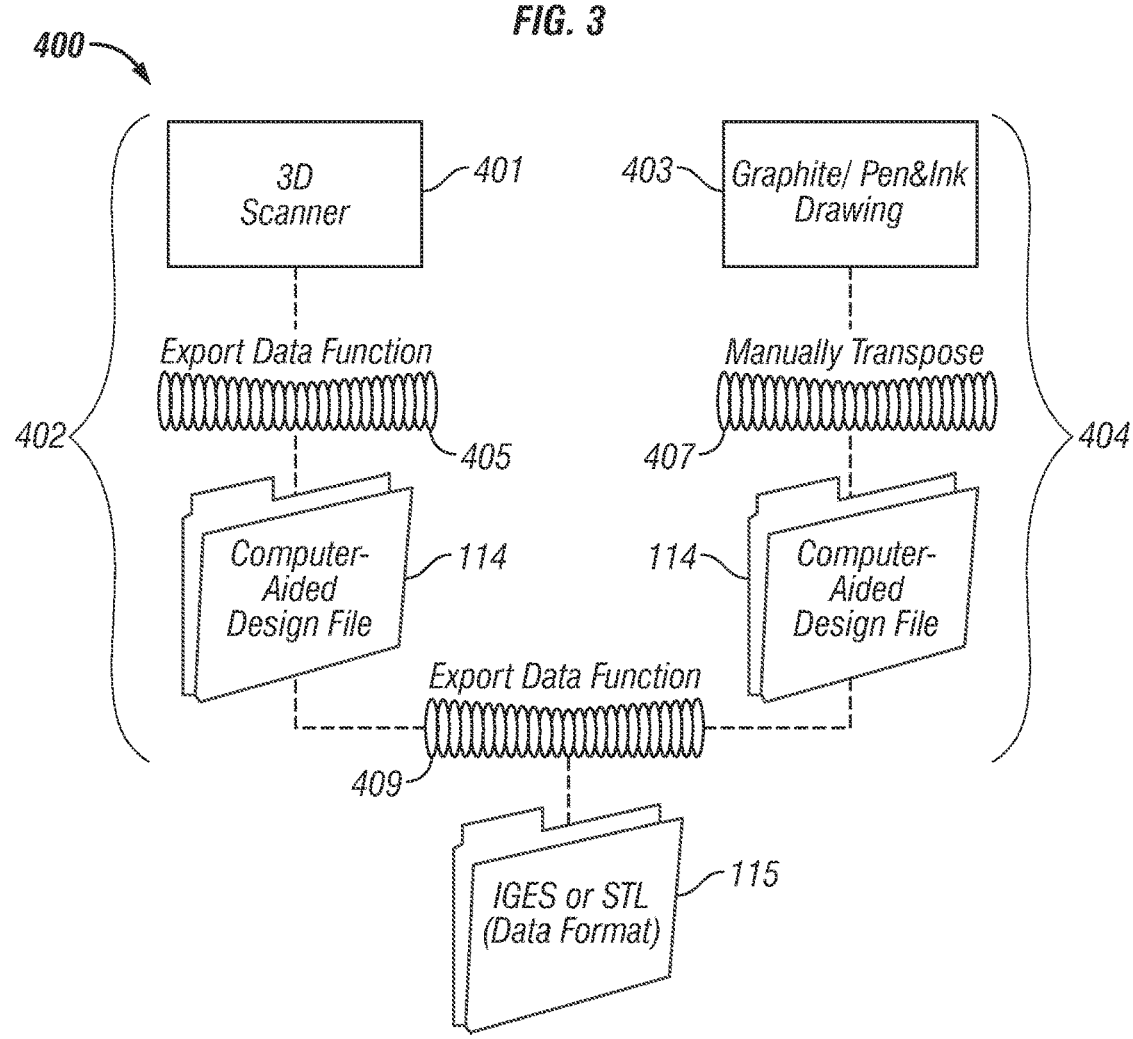
FIG. 4 illustrates a block diagram of a system for producing computer-aided design files for use in producing the dispensed product depicted in FIG. 1, in accordance with an alternative embodiment.

Once the product 104 is returned to the vending machine/unmanned kiosk/terminal 102, a reward (i.e. money) can be credited to any party whose device has been used in the successful transfer of the object to the vending machine/unmanned kiosk/terminal 102 on behalf of the consumer/first party (i.e., owner of the vending machine/unmanned kiosk/terminal 102). Alternatively, a customer/manufacturer may transfer to the central server 110 computer-aided design files 114 created by a scanner (as shown in FIG. 4).

Inherent with system 100 is a method for rendering product 104 via the three-dimensional rendering apparatus 102 as illustrated blocks 1-7. As indicated at block 1, a user can utilize the mobile device 106 to choose from a selection of products from the central server 110 and then purchase such a product. Thereafter, as depicted at block 2, a confirmation code can be provided from the control server 110 back to the mobile device 106. Next, as illustrated at block 3, a confirmation code can be entered to the vending machine 102 via the mobile device 106 or directly at a user interface located on the three-dimensional rendering apparatus 102. Next, as illustrated at block 4, the Initial Graphic Exchange Specification (IGES)/Standard for the Exchange of Product Model Data (STEP) file, or equivalent product data model file 115 of the product 104 can be downloaded to the vending machine 102. Thereafter, as described at block 5, a particular amount of time can be allotted for manufacturing the product 104 via the vending machine 102. Next, as indicated at block 6, the product 104 can be dispensed via the vending machine 102. Finally, and optionally, as indicated at block 7, the dispensed item/product 104 can be returned to the three-dimensional rendering apparatus 102 (i.e., vending machine).

The system 100 and associated method depicted in FIG. 1 can be implemented utilizing any number of mini-manufacturing, rapid-prototype and/or stereo-lithographic approaches. For example, one type of a stereo-lithographic approach that can be utilized in association with the three-dimensional rendering apparatus 102 is disclosed in U.S. Pat. No. 7,318,718 entitled "Stereolithographic Apparatus and Method for Manufacturing Three-Dimensional Object", which issued to Takakuni Ueno on Jan. 15, 2008. U.S. Pat. No. 7,318,718 is incorporated herein by reference in its entirety. Examples of rapid-protyping applications that can be utilized in association with the three-dimensional rendering apparatus 102 are disclosed in U.S. Pat. No. 7,383,768, entitled "Rapid Prototyping and Filling Commercial Pipeline", which issued to Reichwein, et al., on Jun. 10, 2008. U.S. Pat. No. 7,383,768, which is incorporated herein by reference in its entirety, describes a means to rapidly develop and modify prototype surface coverings for customer review and approval and fill the commercial pipeline while more conventional production equipment is obtained, installed and tested. U.S. Pat. No. 7,383,768 additionally describes a rapid prototype approach that fills the commercial pipeline and includes a digital printing system to print a film and a press for laminating and embossing the printed film to a substrate. The press uses an embossing plate or roll, which is made from ebonite or by three-dimensional printing equipment. It can be appreciated that such approaches are referenced herein for illustrative purposes only and are not limiting factors of the disclosed rendering apparatus 102. Instead, those skilled in the art can appreciate that a number of other mini-manufacturing, rapid-prototype and/or stereo-lithographic approaches can be adapted for use with the rendering apparatus 102.

System 100 provides the ability to manufacture a limited number of products of a specific size in a very short period of time (e.g., within minutes). The product 104 can be rendered via the three-dimensional rendering apparatus 102 from, for example, a thermoplastic polymer, or another suitable material. System 100 can be equipped to provide a moderate degree of quality assurance and reliability with a reduced number of manual and time consuming production steps and operations. Additionally, system 100 can incorporate the programming of an automatic identification method, A.I.M./Reconfigurable chip (e.g., RFID tag). Such an automatic identification method, A.I.M./Reconfigurable chip (e.g., RFID tag) can be embedded into all parts of the product 104. The product 104 can be made of a hard, rigid material (e.g., with limited moveable parts). Components (when necessary) are few and should be assembled after being dispensed—employing a method of "snapping the parts together".

Various types of manufacturing technologies and/or base materials can be employed with respect to rendering/manufacturing the product 104 via the vending machine 102. For example, vending machine 102 can utilize additive technologies, the main difference found in the manner in which layers are built to create parts for product 104. Possible prototyping technologies that vending machine 102 can employ, include, for example, selective laser sintering (SLS), fused deposition modeling (FDM), stereo-lithography (SLA), laminated object manufacturing, and so forth. Vending machine 102 may thus melt or soften material to produce particular layers (e.g., SLS, FDM), whereas other processing steps may involve laying liquid material thermo-sets that are cured with different technologies. In the case of lamination systems, for example, thin layers can be cut to shape and then joined together. Examples of base materials that the vending machine/three-dimensional rendering apparatus 102 can utilize include, for example, thermoplastics, metal powders, eutectic metals, photopolymer, and paper, to name a few.

Figure 2:
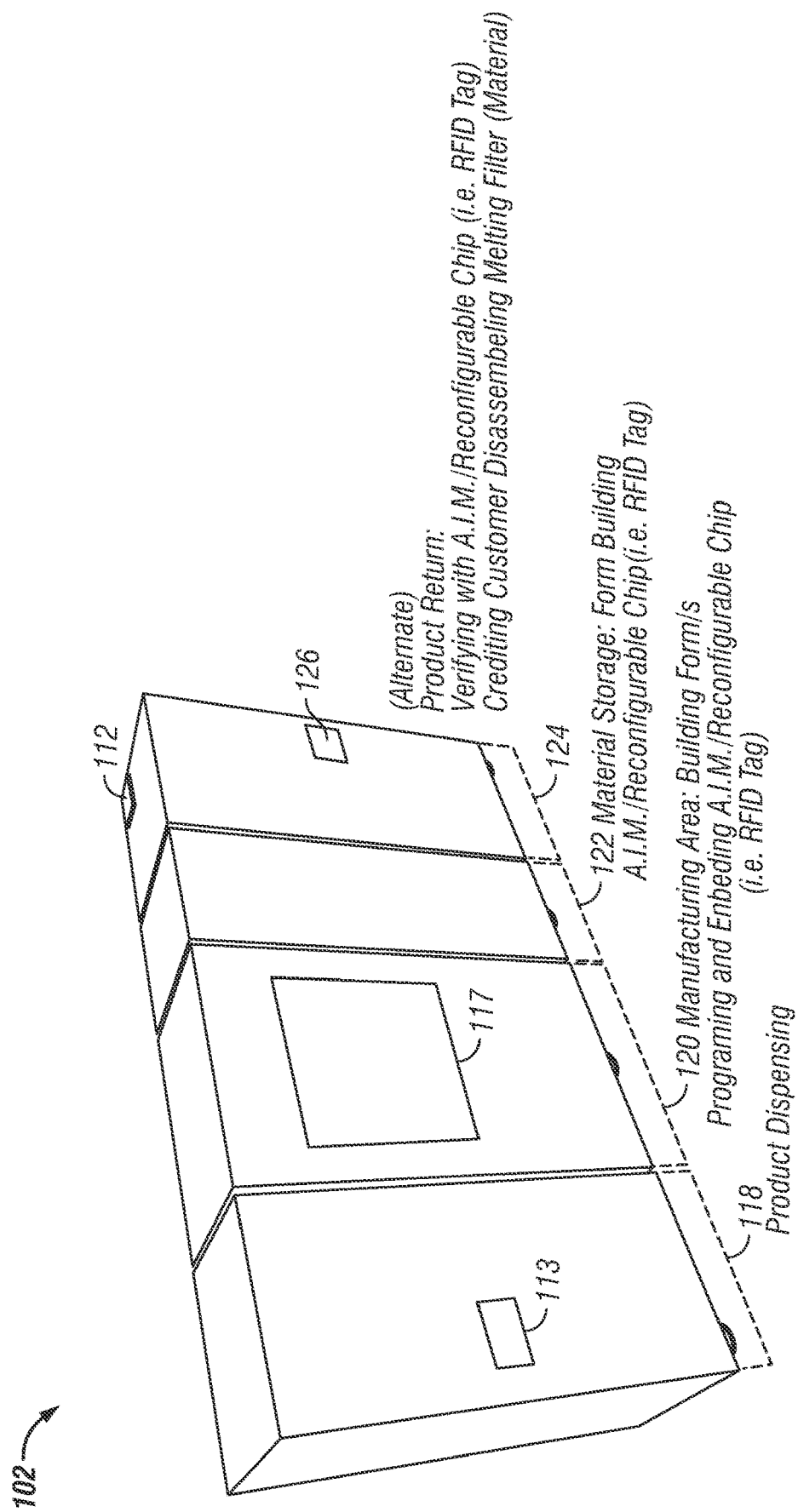
FIG. 2 illustrates a pictorial diagram of the three-dimensional rendering apparatus depicted in FIG. 1, in accordance with a preferred embodiment.

FIG. 2 illustrates a pictorial diagram of the three-dimensional rendering apparatus 102 depicted in FIG. 1, in accordance with a preferred embodiment. Note that in FIGS. 1-2, identical or similar parts or elements are generally indicated by identical reference numerals. The three-dimensional rendering apparatus 102 (e.g., vending machine/unmanned kiosk/terminal) can function as an automatic retailing apparatus. In this context, the vending machine 102 can operate as a portable, stand alone, unmanned, automatic manufacturing and retail dispensing pod. Vending machine 102 can also include a material storage area 122, which is configured to store manufacturing base materials (e.g., thermoplastic polymer) and in some embodiments, store an automatic identification method, A.I.M./Reconfigurable chip (e.g., RFID tag). The vending machine 102 preferably does not take or hold physical money, but does receive, transmit and store data. Although it should be appreciated that various payment mechanisms can be included with the three-dimensional vending machine 102, (e.g., cash, credit card, debit-ATM card acceptance hardware and electronics).

Vending machine 102 can also be equipped with a portal or view window 117 for viewing the product in production and also an area 120 for manufacturing the product 104. The manufacturing area 120 includes building form(s), programming and embedding A.I.M./Reconfigurable chip (e.g., RFID tag). Vending machine 102 can also be configured to include a display area 113 for communicating text and/or graphic-based information that pertains to the operation of vending machine 102. The product 104, as depicted in FIG. 1, can be dispensed via product dispensing area 118 of the vending machine 102. As it pertains to its recycling scenario, vending machine 102 can also be equipped with a (alternate) product return area 124, which can be provided in vending machine 102 for returning product 104 and verifying its recycling compatibility to the automatic identification method, A.I.M./Reconfigurable chip (e.g., RFID tag).

Note that as utilized herein, the acronym RFID refers generally to Radio-frequency identification, which is an automatic identification method that relies on and stores and remotely retrieves data utilizing components called RFID tags or transponders. An RFID tag is an object that can be applied to or incorporated into a product, animal, or person for the purpose of identification using radio waves. Some tags can be read from several meters away and beyond the line of sight of the reader. Most RFID tags contain at least two parts. One is an integrated circuit for storing and processing information, modulating and demodulating a (RF) signal, and other specialized functions. The second is an antenna for receiving and transmitting the signal. Chipless RFID allows for discrete identification of tags without an integrated circuit, thereby allowing tags to be printed directly onto assets at a lower cost than traditional tags.

The material utilized to make the product 104 such as, for example, thermoplastic polymer, can be recycled (e.g., re-melted and re-molded) by the device/machine 102 for future use. Vending machine 102, therefore, possesses the ability to identify the returned product as being of an appropriate material, (i.e., "automatic identification method" (e.g., an RFID tag)). The vending machine 102 can separate the material from the "automatic identification method" (e.g., RFID tag) and the material can be then re-melted and stored by the vending machine 102 for future use. A reward/refund (e.g., money or credit) can be credited to any party whose product has been returned for successful re-melting and storing to vending machine/unmanned kiosk/terminal 102 on behalf of the consumer/first party (e.g., owner of vending machine/unmanned kiosk/terminal 102).

The three-dimensional rendering apparatus 102 can, in some environments, be implemented as a pedestrian product vending machine, such as an unmanned kiosk or terminal. Such a pedestrian product vending machine can utilize rapid-prototyping techniques with mechanical, thermal, durable and low cost properties. The pedestrian product vending machine can be uploaded with the 3D product manufacturing specifications of products that a consumer has purchased from a wireless device (i.e. mobile phone), such as mobile device 106 as depicted in FIG. 1. The vending machine 102 can in turn manufacture the product 104 with a recyclable material. Once the consumer has finished using the product (e.g., within 24 hours), it is returned to the same or similar vending machine at a different location for recycling (melting) where a refund is accrued to the consumers online credit/money account. Environment control portal 126 can be provided to regulate the operating environment (e.g., temperature and emissions) from the three-dimensional vending apparatus 102 during manufacture and recycling of objects.

Figure 3:
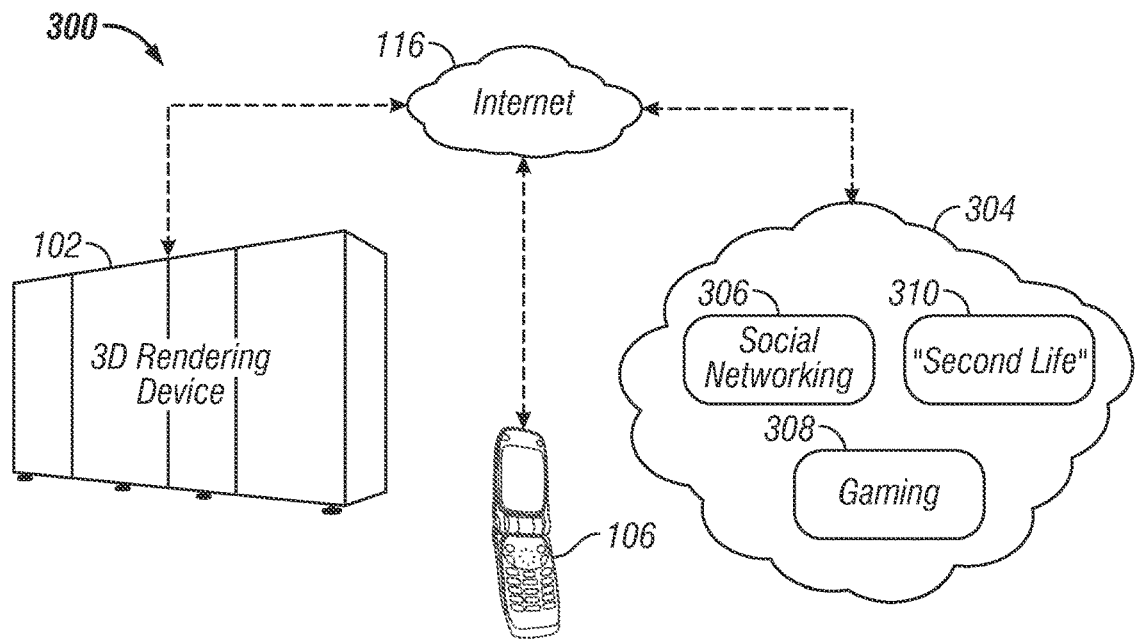
FIG. 3 illustrates a block diagram of a system that utilizes the three-dimensional rendering apparatus to bridge the gap between the physical world and the virtual world, in accordance with an alternative embodiment.

FIG. 3 illustrates a block diagram of a system 300 that utilizes the three-dimensional rendering apparatus 102 to bridge the gap between the physical world and the virtual world, in accordance with an alternative embodiment. Note that in FIGS. 1-3, identical or similar parts or elements are indicated by identical reference numerals. In system 300, the mobile device 106 can communicate with the vending machine 102 via a network 116 (e.g., the Internet). Mobile device 106 can also access a virtual environment 304 via network 116. Examples of virtual environment 304 include, but are limited to, a social networking site 306, a gaming site 308, a virtual world shown as "Second Life" site 310, and so forth. As indicated previously, examples of mobile device 106 include cellular telephones, wireless Personal Digital Assistants (PDA's), so-called SmartPhones, laptop computers, and so forth. It can be appreciated, of course, that non-wireless devices (e.g., desktop computers) may also be utilized in addition to or in place of mobile device 106. For example, any computer connected to the Internet/network 116 may be utilized for achieving rendering of a three-dimensional object via the three-dimensional rendering device 102. Physical-to-virtual rendering can include utilization of a scanner, as will be described in FIG. 4, to capture the three-dimensional aspects of an object for upload and use in the virtual world (e.g., for trading, display, and re-rendering into physical like physical objects at remote locations). Virtual-to-physical rendering can include the conversion of a three-dimensional virtual object into a three-dimensional physical object.

In the scenario illustrated in FIG. 3, the rendering apparatus 102 can function as a virtual-to-physical asset and/or merchandising machine, which includes the use of a custom skin for a reconfigurable chip. RFID-tagged physical objects can be created by the three-dimensional rendering apparatus 102 (e.g., vending machine/unmanned kiosk/terminal, etc.) and configured to represent a certain state or ownership of a item in virtual worlds 304, such as the social network site 306, gaming site 308, "Second Life" site 310, and so on. The physical object thus becomes a one-to-one transferable good for in-game items. Such an approach allows players in gaming environments, for example, to trade items in the real world as though they had traded them online. This type of approach also increases collectability by limiting access to produce certain models to those that own that modeled object in the virtual space.

Examples of various virtual environments that can be utilized to implement virtual environment 304 are disclosed in U.S. Patent Application Publication No. US2008/0201321A1 entitled "Apparatuses, Methods and Systems for Information Querying and Serving in a Virtual World Based on Profiles" dated Aug. 21, 2008 by Fitzpatrick et al., which is incorporated herein by reference in its entirety. The disclosure of U.S. Patent Application Publication No. US2008/0201321A1 details the implementation of apparatuses, methods, and systems for information querying and serving in a virtual world based on profiles that can include the use of personalized avatars to communicate and engage in trade. Such virtual worlds may include, for example, massive multiplayer online games like The Sims Online, Everquest, World of Warcraft, Second Life, and/or the like. Information and/or advertisement providers may use a code triggered information server to serve context, demographic, and behavior targeted information to users in a virtual world. Users, in turn, trigger the provision of information by scanning or observing codes or information, or by making decisions within a virtual world such as attempting a mission within a game.

In U.S. Patent Application Publication No. U.S. Patent Application Publication No. US2008/0201321A1, the triggers, together with virtual world geographic, temporal, and user-specific information, are obtained by the server that receives, processes, and records the message. Based on these messages and a user profile—which may include continuously updated user-specific behavior information, situational and ambient information, an accumulated history of triggers and integration with outside database information—the server selects information to serve to the user in a virtual world from an information base. Aspects disclosed in U.S. Patent Application Publication No. US2008/0201321A1 can be used to implement, for example, social networking site 306, gaming site 308, the "Second Life' site 310, and so forth.

The so-called "Second Life" virtual environment, for example, (also abbreviated as "SL") is an Internet-based virtual world video game developed by Linden Research, Inc. (commonly referred to as Linden Lab), which came to international attention via mainstream news media in late 2006 and early 2007. A free downloadable client program called the Second Life Viewer enables its users, called "Residents", to interact with each other through motional avatars, providing an advanced level of a social network service combined with general aspects of a metaverse. In this virtual environment, Residents can explore, meet other Residents, socialize, participate in individual and group activities, and create and trade items (virtual property) and services with one another. Thus, in the context of the disclosed embodiments, a Resident of an SL world can order an item virtually available in the SL world and then have that item physically rendered as a three-dimensional (real) object via a vending machine such as the three-dimensional rendering apparatus 102 disclosed herein.

Another example of a virtual world that can be utilized to implement virtual environment 304 is disclosed in U.S. Patent Application Publication No. US2006/0178966A1 entitled "Virtual World Property Disposition After Virtual World Occurrence" by inventors Jung, et al., which published on Aug. 10, 2006. U.S. Patent Application Publication No. US2006/0178966A1, which is incorporated herein by reference in its entirety, discloses a method and system that provides transactions and arrangements in virtual world environments. In such a virtual world, a user can participate in transactions to acquire virtual property and related virtual rights. In some implementations of U.S. Patent Application Publication No. US2006/0178966A1, real-world and virtual parties can be involved in possible transfers of various types of virtual property and virtual property rights.

By producing the manufactured object 104 in 3D, the disclosed systems 100 and/or 300, for example, are also capable of tying the object 104 in to, for example, the model/figurine market (e.g., as seen in Japan) which is quite large and is growing in the US. Each object becomes a recognizable token of in-game status as well as an authentic currency for online negotiation. Ownership of a virtual object, such as a unique weapon or armor item in game, becomes increasingly attractive (valuable) because of the capability to own such an object physically as well. The two desires strengthen each other. The physical items themselves can also be distributed as promotional materials or by other entities wishing to give access to online resources in a physical form. These objects then become a transferable token of online status and as such strengthen the consumer experience.

Another example of how system 300 can operate involves the renting of an automobile. A customer has to rent a car (RaC). That customer goes to a RaC website. Previously, the customer has applied for (online) and received a membership/identification card and ID #, pays for the car and is given instructions on where to pick up the car. The customer then arrives at the car pickup location and goes to a vending machine such as, for example, vending machine 102. At the vending machine 102, the customer scans his or her membership/identification card, enters his or her ID # and is then given a physical key device embedded with a chip. The chip allows access to a car lot and a vehicle. The physical key (e.g., a custom skin) is an object that provides physical/haptic recognition of the activity. Once the car is returned, the key is then placed back into the vending machine and the customer is given a refund. The material of the skin is separated from chip, melted and reused for the next customer by the vending machine 102. In a car rental scenario, physical damage cannot be determined; however, fuel levels when a vehicle is rented and returned can be recorded on the physical key RFID using known RFID communications and recording capabilities where the vehicle and fuel gage are monitored and status is communicated to the key-based RFID. Fuel levels can then be utilized for billing purposes.

FIG. 4 illustrates a block diagram of a system 400 for producing computer-aided design files 114 that can then be exported into a file 115 such as, for example, an Initial Graphic Exchange Specification (IGES)/Standard for the Exchange of Product Model Data (STEP) file (or equivalent product data model file), for use in producing the product 104. Note that in FIGS. 1-4, identical or similar parts or elements are generally indicated by identical reference numerals. System 400 generally includes two general aspects 402 and 404, which can be implemented in lieu of one another or in association with one another. Aspect 402 of system 400 includes the use of a scanner 401 to scan a three-dimensional object and produce computer-aided design file 114 of that three-dimensional object. Such computer-aided design file(s) 114 that then are exported into an Initial Graphic Exchange Specification (IGES)/Standard for the Exchange of Product Model Data (STEP) file or equivalent product data model file 115 to be finally utilized in the rendering of product 104, as depicted in FIGS. 1-3. An exporting data function 405 allows the data from the scanner 401 to be exported to the computer-aided design file 114. Thereafter, another data export function 409 (which may be the same export data function as that of function 405 or a different function altogether) can export the computer aided design file 114 to the IGES or STL data format 115 or another appropriate data format.

Aspect 404 of system 400 can also include the use of graphite and/or pen and ink drawing (and/or any analogue rendering material) 403 to be manually transposed 407 into a computer-aided design file 114 to create a three-dimensional object. Such computer-aided design files 114 can then be exported into a file format 115 such as, for example, an Initial Graphic Exchange Specification (IGES)/Standard for the Exchange of Product Model Data (STEP) file (or equivalent product data model file), to be finally utilized in the rendering of product 104, as depicted in FIGS. 1-3. Scanner 401 can be utilized to capture the three-dimensional aspects of an object for upload and use in the virtual world (e.g., for trading, display, and re-rendering into physical like physical objects at remote locations). This can be referred to as physical-to-virtual object rendering. Virtual-to-physical rendering can later take place, which can include the conversion of a three-dimensional virtual object into a three-dimensional physical object.

One example of a scanner or scanning approach that can be utilized to implement the scanner 401 of aspect 402 is disclosed in U.S. Pat. No. 7,324,132 entitled "Imaging Three-Dimensional Objects," which issued to Said, et al. on Jan. 29, 2008. U.S. Pat. No. 7,324,132, which is incorporated herein by reference in its entirety, discloses imaging systems and method, including in one aspect, an imaging system that includes a light source that is operable to generate a beam of light directed along a beam path and an optical element that is operable to rotate about a rotational axis. The optical element has two or more optical faces that are position-able to intersect the beam path over respective non-overlapping ranges of rotational positions of the optical element. Two or more different optical faces are operable to scan the beam of light in different respective scan planes during rotation of the optical element. In an imaging method of U.S. Pat. No. 7,324,132, a beam of light can be directed along a beam path. The beam path can be consecutively intersected with two or more different optical faces to scan the light beam in different respective scan planes.

It can be appreciated that the scanning approaches disclosed in U.S. Pat. No. 7,324,132 represent just a few examples of a scanning technique/system that can be utilized to implement scanner 401 in order derive a computer-aided design file 114. Other types of scanners, both 3D and 2D, can also be used for scanning purposes with respect to scanner 401. For example, a two-dimensional scanner can be utilized to implement scanner 401. Two-dimensional data associated with the scanned object can then be extrapolated to three dimensions in order to create the computer-aided design file 114.

Figure 5:
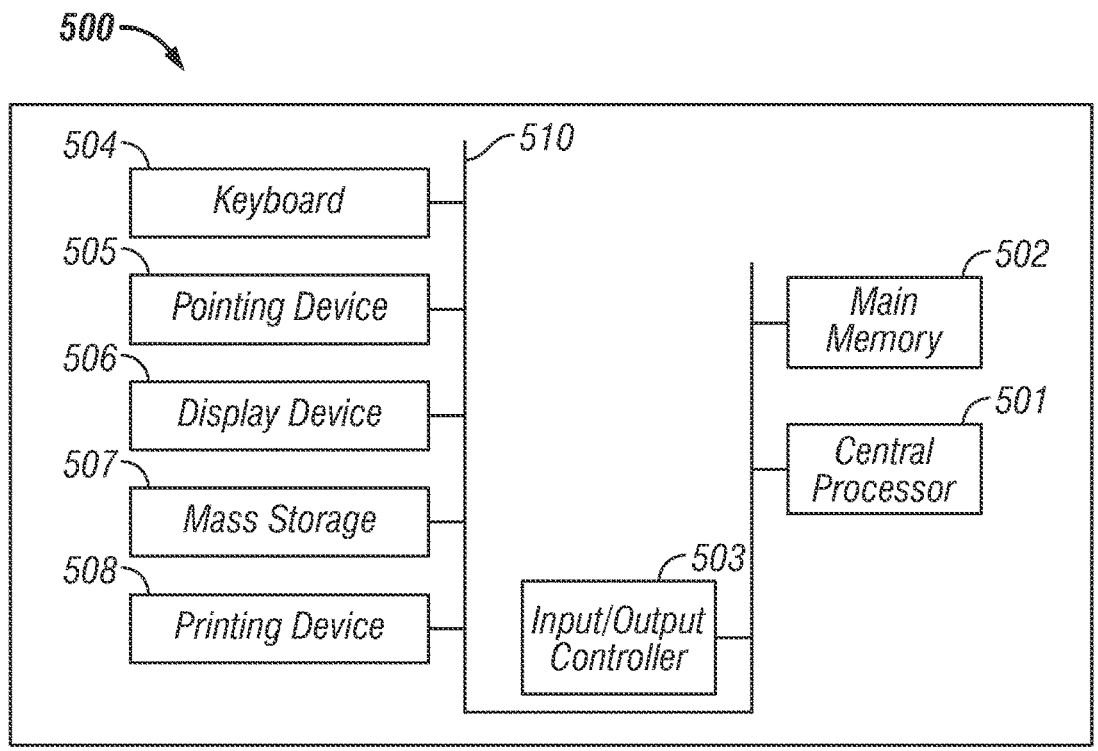
FIG. 5 illustrates a schematic view of a computer system in which the present invention may be embodied.
Figure 6:
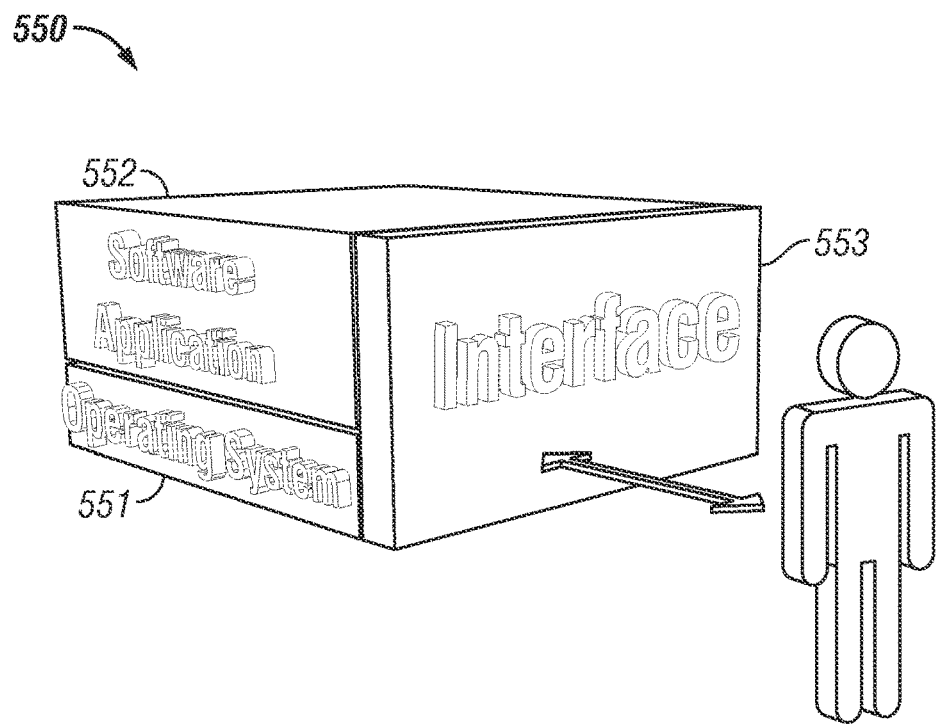
FIG. 6 illustrates a schematic view of a software system including an operating system, application software, and a user interface for carrying out the present invention.
Figure 7:
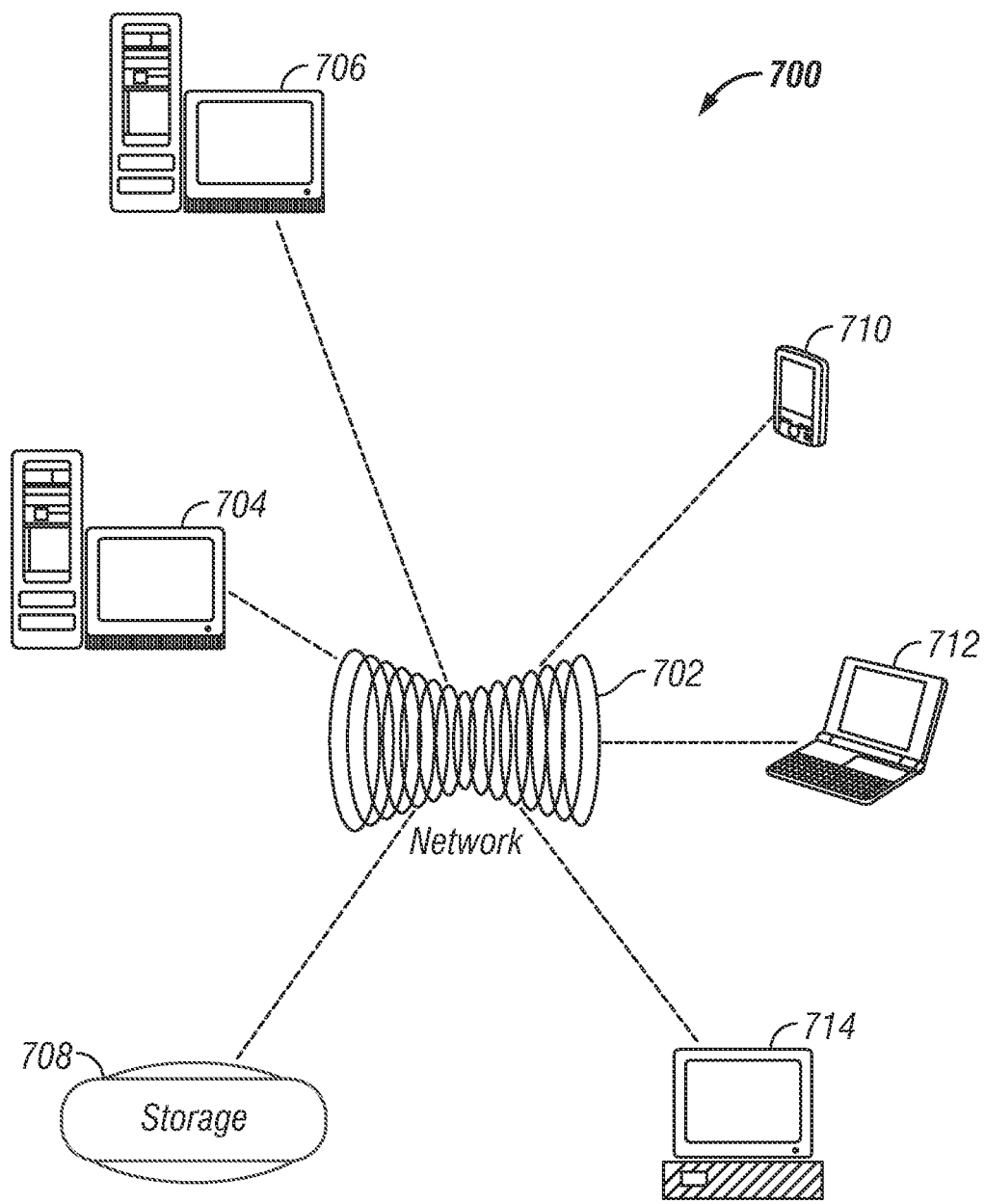
FIG. 7 illustrates a graphical representation of a network of data processing systems in which aspects of the present invention may be implemented.

FIGS. 5-7 are disclosed herein as exemplary diagrams of data processing environments in which embodiments of the present invention may be implemented. It should be appreciated that FIGS. 5-7 are only exemplary and are not intended to assert or imply any limitation with regard to the environments in which aspects or embodiments of the present invention may be implemented. Many modifications to the depicted environments may be made without departing from the spirit and scope of the present invention.

FIG. 5 illustrates that the present invention may be embodied in the context of a data-processing apparatus 500 comprising a central processor 501, a main memory 502, an input/output controller 503, a keyboard 504, a pointing device 505 (e.g., mouse, track ball, pen device, or the like), a display device 506, and a mass storage 507 (e.g., hard disk). Additional input/output devices, such as a printing device 508, may be included in the data-processing apparatus 500 as desired. As illustrated, the various components of the data-processing apparatus 500 communicate through a system bus 510 or similar architecture. Data-processing apparatus 500 may communicate with a network such as, for example, the Internet 116 in order to render a three-dimensional object such as item 104 via the three-dimensional rendering device 102. Note that the communication with the Internet 116 or another network may occur wirelessly or via a landline or both.

FIG. 6 illustrates a computer software system 550 which is provided for directing the operation of the data-processing apparatus 500. Software system 550, which is stored in system memory 502 and on disk memory 507, can include a kernel or operating system 551 and a shell or interface 553. One or more application programs, such as application software 552, may be "loaded" (e.g., transferred from storage 507 into memory 502) for execution by the data-processing apparatus 500. The data-processing apparatus 500 receives user commands and data through user interface 553; these inputs may then be acted upon by the data-processing apparatus 500 in accordance with instructions from operating module 551 and/or application module 552.

The interface 553, which is preferably a graphical user interface (GUI), also serves to display results, whereupon the user may supply additional inputs or terminate the session. In an embodiment, operating system 551 and interface 553 can be implemented in the context of a "Windows" system. Application module 552, on the other hand, can include instructions, such as the various operations described herein with respect to the various components and modules described herein such as, for example, the method 800 depicted in FIG. 8.

FIG. 7 illustrates a graphical representation of a network of data processing systems in which aspects of the present invention may be implemented. Network data processing system 700 is a network of computers in which embodiments of the present invention may be implemented. Network data processing system 700 contains network 702, which is the medium used to provide communications links between various devices and computers connected together within network data processing apparatus 500. Network 702 may include connections, such as wire, wireless communication links, or fiber optic cables.

In the depicted example, server 704 and server 706 connect to network 702 along with storage unit 708. In addition, clients 710, 712, and 714 connect to network 702. Note that network 702 depicted in FIG. 7 is analogous to network 116. Client 710 may be, for example, a cellular communications device such as a cell phone, PDA, Smartphone, etc. Client 712 may be, for example, a laptop computer or other mobile computing device capable of communicating wirelessly (or non-wirelessly/landline) with network 702. In the case of a non-wireless connection, client 712 is capable of communicating with network 702 via an Ethernet connection. Client 714 may be, for example, a computer workstation that communicates wirelessly and/or non-wirelessly with network 702. Similarly, storage unit 708 is analogous to storage unit 112 depicted in FIG. 1.

Thus, the clients 710, 712, and 714 illustrated in FIG. 7 may be, for example, personal computers or network computers. Clients 710, 712, and/or 714 may also be hand held wireless devices such as, for example, wireless hand held device 106 depicted in FIG. 1. One or more of clients 710, 712, and/or 714 may also be, for example, a three-dimensional rendering apparatus, such as, for example, the kiosk/vending machine 102. Additionally, the data-processing apparatus 500 depicted in FIG. 5 can be, for example, a client such as client 710, 712, and/or 714. Alternatively, data-processing apparatus 500 can be implemented as a server, such as servers 704 and/or 706, depending upon design considerations. One or more servers 704 and/or 706 may function as, for example, the control server 110.

In the depicted example, server 704 may provide data, such as boot files, operating system images, and applications to clients 710, 712, and 714. Clients 710, 712, and 714 are clients to server 704 in this example. Network data processing system 700 may include additional servers, clients, and other devices not shown. Specifically, clients may connect to any member of a network of servers which provide equivalent content.

In the depicted example, network data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 700 also may be implemented as a number of different types of networks such as, for example, an intranet, a local area network (LAN), or a wide area network (WAN). FIG. 7 is intended as an example and not as an architectural limitation for different embodiments of the present invention.

Embodiments of the present invention may be implemented in the context of a data-processing system such as, for example, data-processing apparatus 500, computer software system 550, data processing system 700 and network 702 depicted respectively in FIGS. 5-7. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 8:
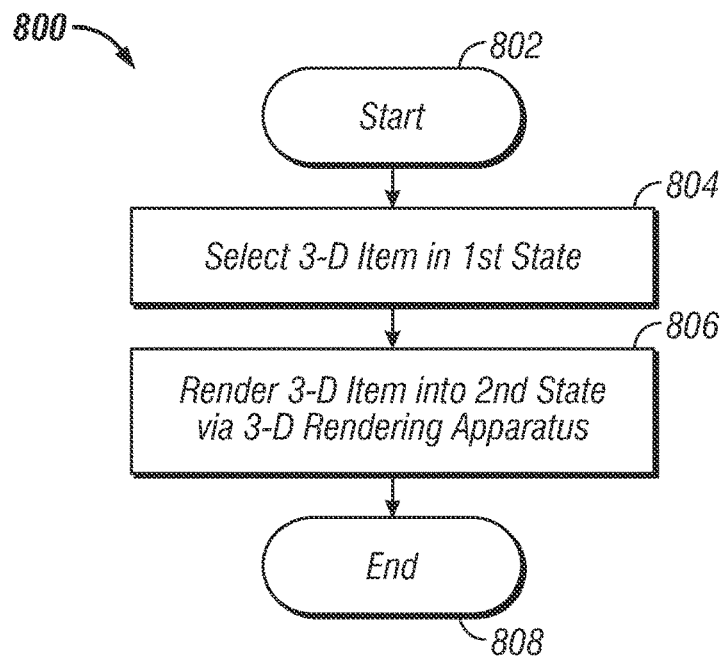
FIG. 8 illustrates a high-level flow chart of operations depicting logical operational steps of a method for rendering a three-dimensional item, in accordance with a preferred embodiment.

FIG. 8 illustrates a high-level flow chart of operations depicting logical operational steps of a method 800 for rendering the three-dimensional item 104 via the three-dimensional rendering device 102, in accordance with a preferred embodiment. Note that in FIGS. 1-10, identical or similar parts or elements are generally indicated by identical reference numerals. Note that the method 800 can be implemented in the context of a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 800 described herein can be deployed as process software in the context of a computer system or data-processing system as that depicted in, for example, FIGS. 5, 6, and/or 7.

The process generally begins, as indicated at block 802. Next, as illustrated at block 804, a three-dimensional item in a first state can be selected for subsequent rendering into a second state. The operation depicted at block 804 can be similar to the operation depicted in block 1 in FIGS. 1-4, wherein one can choose from a selection of products from the central server 110, and the product(s) is selected. The operation depicted at block 804 can also include three-dimensional scanning of a three-dimensional object for upload into a server and use in the virtual world. Next, as described at block 806, the three-dimensional item can be rendered in the second state via the three-dimensional rendering apparatus 102. The second state can include rendering of a virtual object into a physical object (e.g., manufacturing) as well as the rendering of a physical object into a virtual object (e.g., scanning). For example, as indicated in FIG. 1, the vending machine/rendering apparatus 102 can render the item selected via the wireless hand held device 106 as item 104. The vending machine 102 renders the item 104 based on an Initial Graphic Exchange Specification (IGES)/Standard for the Exchange of Product Model Data (STEP) file or equivalent product data model file 115, which is derived from the computer-aided design file/s 114. Following processing of the operation depicted at block 806, the process can then terminate, as indicated at block 810

Figure 9:
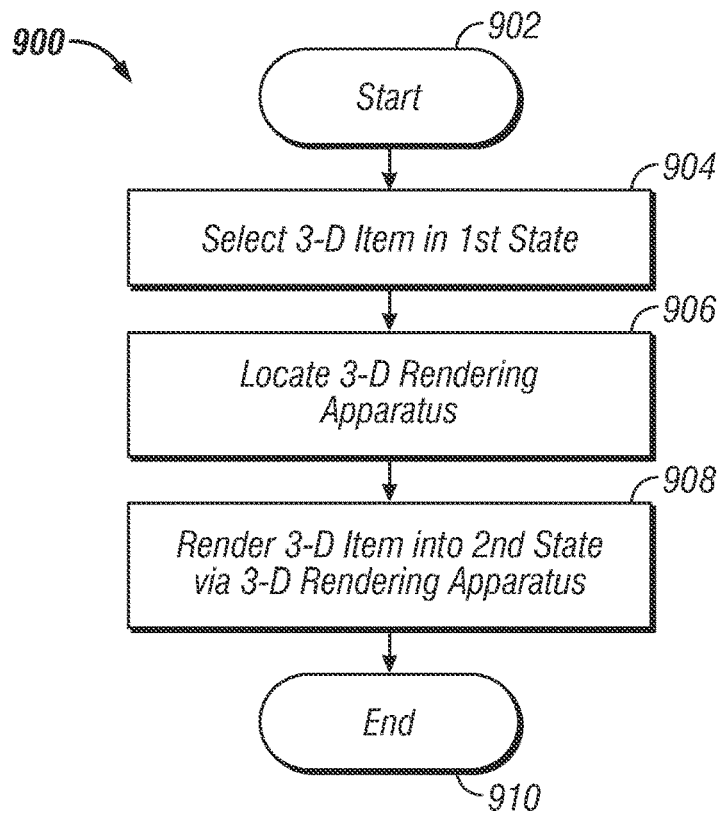
FIG. 9 illustrates another high-level flow chart of operations depicting logical operational steps of a method for rendering a three-dimensional item, in accordance with a preferred embodiment.

FIG. 9 illustrates a high-level flow chart of operations depicting logical operational steps of a method 900 for rendering the three-dimensional item 104 via the three-dimensional rendering device 102. The process generally begins, as indicated at block 902. Next, as illustrated at block 904, a three-dimensional item in a first state can be selected for subsequent rendering into a second state. Then, as indicated at block 906, a three-dimensional rendering apparatus such as apparatus 102 of FIGS. 1-4 can be located, wherein apparatus 102 is capable of rendering the three-dimensional item in a second state. Thereafter, as illustrated at block 908, the three-dimensional item can be rendered in the second state via the three-dimensional rendering apparatus 102. Following processing of the operation depicted at block 908, the process can then terminate, as indicated at block 910.

Figure 10:
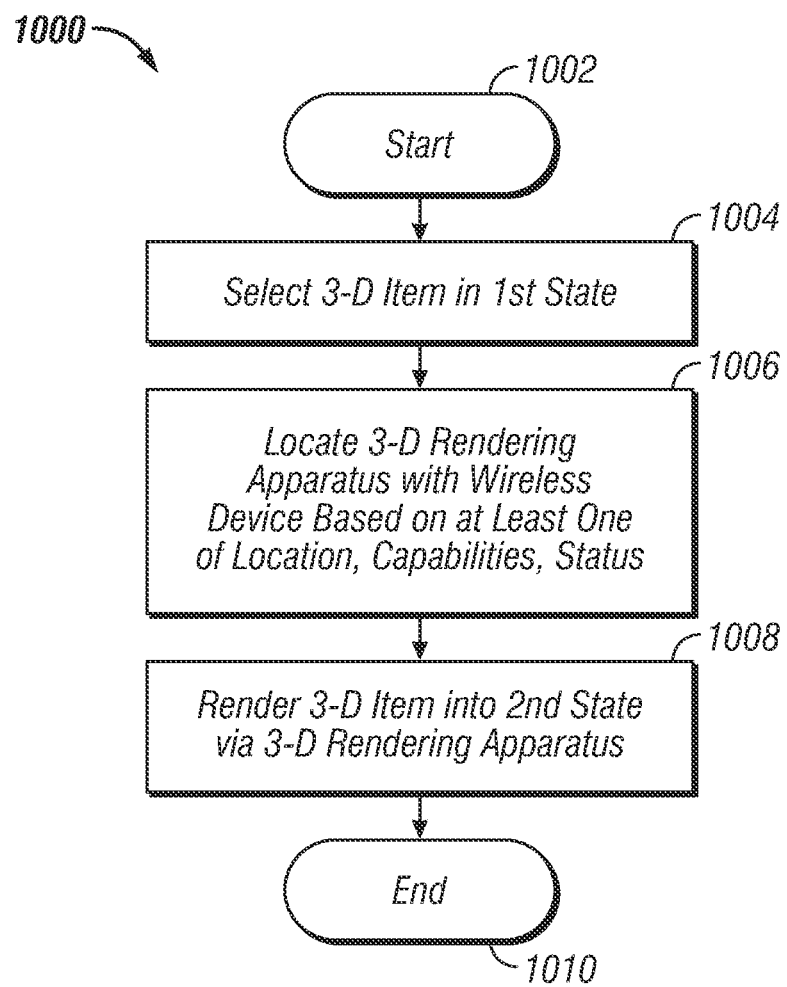
FIG. 10 illustrates another high-level flow chart of operations depicting logical operational steps of a method for rendering a three-dimensional item, in accordance with a preferred embodiment.

FIG. 10 illustrates a high-level flow chart of operations depicting logical operational steps of a method 1000 for rendering the three-dimensional item 104 via the three-dimensional rendering device 102. The process generally begins, as indicated at block 1002. Next, as illustrated at block 1004, a three-dimensional item in a first state can be selected for subsequent rendering into a second state. Then, as indicated at block 1006, a three-dimensional rendering apparatus such as apparatus 102 of FIGS. 1-4 can be located based on at least one of location, capabilities and operational status, wherein apparatus 102 is capable of rendering the three-dimensional item in a second state. Thereafter, as illustrated at block 1008, the three-dimensional item can be rendered in the second state via the three-dimensional rendering apparatus 102. Following processing of the operation depicted at block 908, the process can then terminate, as indicated at block 1010. A wireless handheld device with cellular communications network access can be used to locate a three-dimensional rendering apparatus based on at least one of capabilities, operational status, and location. Location of the three-dimensional rendering apparatus can be based on location of said wireless handheld device. Location of the three-dimensional rendering apparatus can be based the location of the three-dimensional rendering apparatus and/or the location of the wireless handheld device. Location of the three-dimensional rendering apparatus can also be based on location of said wireless handheld device based on the wireless handheld device's GPS position relative to said three-dimensional rendering apparatus. Global positioning system (GPS) technology can be included in handheld devices as well as three-dimensional rendering devices along with data network communications hardware.

Based on the foregoing it can be appreciated that an apparatus 102 and associated systems and methods are disclosed. A three-dimensional item can be selected in a first state for subsequent rendering into a second state. The selection can occur, for example, utilizing a mobile device such as mobile device 106. The selection can be made via the control server 110. The three-dimensional rendering apparatus 102 can be located for rendering the three-dimensional item in a second state. The three-dimensional item can then be rendered in the second state via the three-dimensional rendering apparatus 102. For example, product 104 may constitute the second state and the three-dimensional technical drawings may constitute the first state. The opposite can also hold true. That is, the first state of the three-dimensional item 104 may actually be a physical state and it is desired to render into a virtual state for use in a virtual environment such as, for example, "Second Life". In such a scenario, a user can scan the physical three-dimensional item to derive the computer-aided design file(s) 114, which are then exported into an appropriate format for use in the virtual environment.

One example wherein the embodiments depicted in FIGS. 1-10 may be particularly advantageous is in the country of Japan, although the disclosed embodiments are advantageous for implementation in any number of countries (i.e., European, Asian, Latin American, North American, etc.). In Tokyo, however, there currently lies a unique urban condition unrivalled anywhere on the globe. Tokyo is largely defined by its 12 million plus residents who maintain a perpetual state of decentralization and a pedestrian lifestyle supported by a hidden veneer of ubiquitous technologies. From the intricate networks of public transportation to the omnipresent konbini (e.g., convenience store), nothing has brought such ease and organization to Tokyo's transient lifestyle than the mobile phone, otherwise known as the keitai (e.g., roughly translated as 'something you carry with you').

Japan's successful assimilation of communication technology among its urban centers is bringing critical transnational attention to the 'keitai-enabled social life' it has created. This keitai-enabled social life was initially absorbed into Japan's youth culture and has also affected personal relationships, with additional ramifications due to its presence in public transportation and the home. Mobile communication devices have essentially created a full-time intimate community, enveloping them in what has been described as 'tele-cocooning'. Japan's unique socio-culture response to the mobile phone has confounded western models of modernization and technology.

Leading the development in wireless communication technology, Japanese telecom giant, NTT DoCoMo has over the last nine years mobilized the mobile multimedia revolution. A division of Nippon Telegraph and Telephone, NTT DoCoMo unleashed its wireless Internet, with the launch of its signature T mode service in 1999. NTT DoCoMo then subsequently released, in 2001, the world's first 3G mobile service. With support for much higher data rates, these third-generation protocols have opened the way to an ever growing range of services including on-line book-mobiles, television, music, video conferencing, and the ability to use the keitai as a money transfer device. Ultimately, this has enabled higher proficiency for Tokyoites to communicate privately and commute lighter.

As NTT DoCoMo and other wireless telecom's cast their vision to future incarnations of the keitai, the impact it will have on the design of our cities has defined a new research initiative by NTT DoCoMo. Teaming their Director of Product Department with Japan's leading architects, Kengo Kuma, Jun Aoki and Ryue Nishizawa to assemble a jury panel, these designers selected winning entries to NTT DoCoMo's first sponsored architecture competition. Announced in June 2005, this spatial design competition requested submissions proposing new symbiotic visions between the urban environment, its inhabitants and the keitai.

With human behavior at the center of locating this visionary merging, impromptu spatial domains of free Internet exchange are already being witnessed. Aside from the extroverted displays of new pedestrian theatrics—a negotiation of simultaneous presence in multiple social situations—clues to how the keitai will reorganize our cities may very well come from expanding the scope of what it means to live as a pedestrian—enhanced through new levels of cognitive and sensory experience.

Note that the network 116 in some embodiments may be, for example, a 3G network. The term "3G" as utilized herein refers generally to the third generation of mobile phone standards and technology, superseding 2.5G, and preceding 4G. 3G is based on the International Telecommunication Union (ITU) family of standards under the International Mobile Telecommunications program, IMT-2000. Thus, network 116 may constitute a 3G network, which enables network operators to offer users a wider range of more advanced services while achieving greater network capacity through improved spectral efficiency. 3G services offered by network 116 (or for that matter, network 702), include wide-area wireless voice telephony, video calls, and broadband wireless data, all in a mobile environment. Additional features also include HSPA (High Speed Packet Access) data transmission capabilities able to deliver speeds up to 14.4 Mbit/s on the downlink and 5.8 Mbit/s on the uplink. Unlike IEEE 802.11 (common names Wi-Fi or WLAN) networks, 3G networks are wide area cellular telephone networks which evolved to incorporate high-speed internet access and video telephony. IEEE 802.11 networks are short range, high-bandwidth networks primarily developed for data. Thus, networks 116, 702 and so forth, as discussed herein, can be implemented as a 3G network.

In other embodiments, networks 116, 702 and the like may be implemented as a 4G (also known as Beyond 3G), an abbreviation for Fourth-Generation, which is a term used to describe the next complete evolution in wireless communications. A 4G system will be able to provide a comprehensive IP solution where voice, data and streamed multimedia can be given to users on an "Anytime, Anywhere" basis, and at higher data rates than previous generations.

As the second generation was a total replacement of the first generation networks and handsets; and the third generation was a total replacement of second generation networks and handsets; so too the fourth generation cannot be an incremental evolution of current 3G technologies, but rather the total replacement of the current 3G networks and handsets. The international telecommunications regulatory and standardization bodies are working for commercial deployment of 4G networks roughly in the 2012-2015 time scale. At that point, it is predicted that even with current evolutions of third generation 3G networks, these will tend to be congested.

There is no formal definition for what 4G is; however, there are certain objectives that are projected for 4G. These objectives include that 4G will be a fully IP-based integrated system. 4G will be capable of providing between 100 Mbit/s and 1 Gbit/s speeds both indoors and outdoors, with premium quality and high security.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An apparatus for rendering a three-dimensional item, comprising:
 a vending machine comprising an automatic retailing apparatus, the vending machine including a housing, the housing including a manufacturing area, a material storage area, a computer, a user interface, data storage, and wireless data network communications, wherein the housing further includes:
  a three-dimensional manufacturing system contained in the manufacturing area for automatically manufacturing a three-dimensional item based on a data file received from a remote client over the wireless data network communications and stored in and retrievable from the data storage, the data file is indicative of the three-dimensional item;
  3-D (three-dimensional) printing materials stored in the material storage area wherein the 3-D printing materials are accessible by the three-dimensional manufacturing system for use by the three-dimensional manufacturing system in manufacturing the three-dimensional item in the manufacturing area, and wherein the materials are automatically supplied to the three-dimensional manufacturing system from the material storage area by the three-dimensional manufacturing system; and
  a dispensing area for dispensing the three-dimensional item after the three-dimensional item is manufactured in the manufacturing area, wherein the three-dimensional item is dispensed in the dispensing area.

2. The apparatus of claim 1, further comprising a three-dimensional scanner contained in the manufacturing area for scanning three-dimensional items to create the data file for storage and subsequent use for rendering three-dimensional items scanned by the scanner.

3. The apparatus of claim 1, wherein the materials stored in the material storage area for manufacturing the three-dimensional item comprises at least one A.I.M./Reconfigurable Chip that is embedded in the three-dimensional item during manufacturing of the three-dimensional item in the manufacturing area.

4. The apparatus of claim 1, wherein the materials stored in the material storage area for manufacturing the three-dimensional item comprises at least one RFID tag that is embedded in the three-dimensional item during manufacturing of the three-dimensional item in the manufacturing area.

5. The apparatus of claim 1, wherein the materials stored in the material storage area for manufacturing the three-dimensional item comprises at least one of the following types of materials:
 a thermoplastic, a metal powder, a eutectic metal, and a photopolymer.

6. The apparatus of claim 1, wherein the three-dimensional item is manufacturable in the manufacturing area by selective laser sintering (SLS).

7. The apparatus of claim 1, wherein the three-dimensional item is manufacturable in the manufacturing area by stereo-lithography (SLA).

8. The apparatus of claim 1, wherein the three-dimensional item is manufacturable in the manufacturing area by laminated object manufacturing.

9. The apparatus of claim 1, wherein the three-dimensional item is manufacturable in the manufacturing area by fused deposition modeling (FDM).

10. The apparatus of claim 1, further comprising a payment mechanism, wherein the three-dimensional item is rendered in the manufacturing area after receiving payment at the payment mechanism.

11. The apparatus of claim 1, wherein a control of the three-dimensional manufacturing system for rendering of the three-dimensional item in the manufacturing area is initiated remotely by a wireless hand held device via the data network communications.

12. The apparatus of claim 1, further comprising product return area for verifying recycling compatibility of items and accepting return of the items.

13. The apparatus of claim 1 wherein the three-dimensional manufacturing system comprises a 3-D printer.

* * * * *